United States Patent [19]

Steinberg

[11] 4,423,787

[45] Jan. 3, 1984

[54] HARROW

[76] Inventor: Richard W. Steinberg, 1720 Collette Dr., North Mankato, Minn. 56001

[21] Appl. No.: 291,483

[22] Filed: Aug. 10, 1981

[51] Int. Cl.³ .................... A01B 33/02; A01B 23/02
[52] U.S. Cl. ................................ 172/142; 172/707; 172/643; 56/400
[58] Field of Search ............... 172/155, 159, 160, 142, 172/707, 708, 643; 56/400

[56] References Cited

U.S. PATENT DOCUMENTS

| | | |
|---|---|---|
| 2,990,021 | 6/1961 | Johnson et al. |
| 3,209,841 | 10/1965 | Van Der Lely et al. |
| 3,212,585 | 10/1965 | Bezzerides |
| 3,245,479 | 4/1966 | Dlugosch et al. |
| 3,299,965 | 1/1967 | Sokolik |
| 3,322,203 | 5/1967 | Johnson et al. |
| 3,575,243 | 4/1971 | Mark |
| 3,782,481 | 1/1974 | Quanbeck |
| 3,825,073 | 7/1974 | Gardner et al. |

Primary Examiner—Richard J. Johnson
Attorney, Agent, or Firm—Burd, Bartz & Gutenkauf

[57] ABSTRACT

A harrow mounted on an earthworking tool works the soil adjacent the tool. The harrow has a clamp assembly mounted on the body of a spring earthworking tool. A pair of coil springs are mounted on the clamp assembly. Each coil spring is connected to a downwardly directed earthworking tine.

21 Claims, 10 Drawing Figures

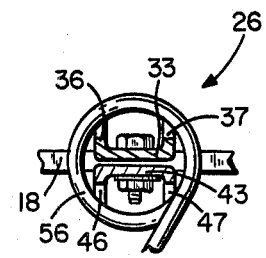
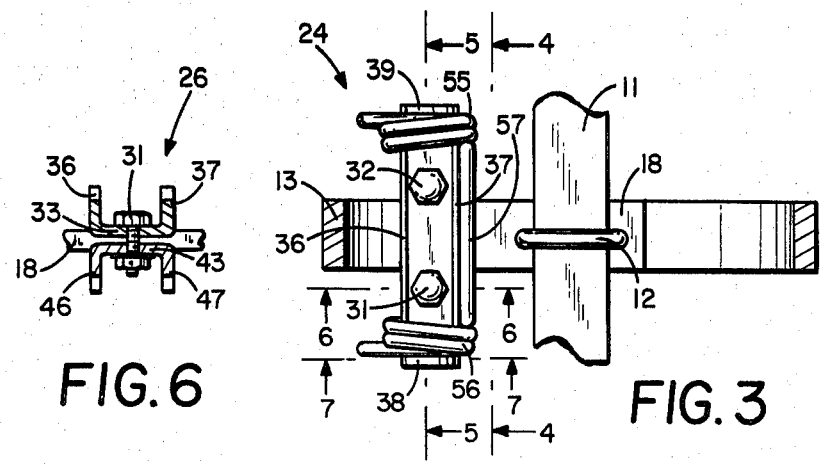
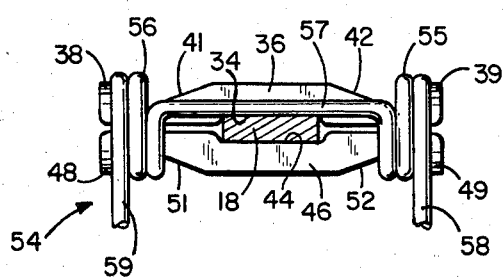
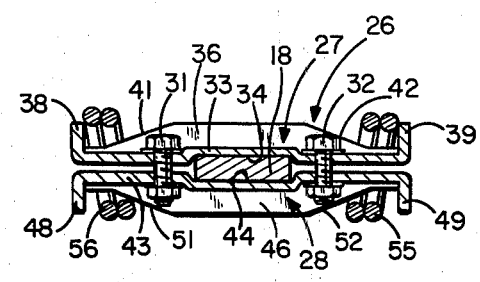
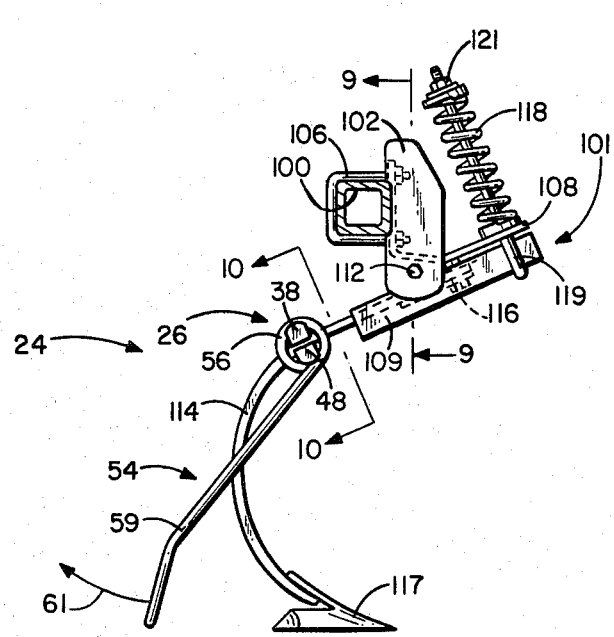
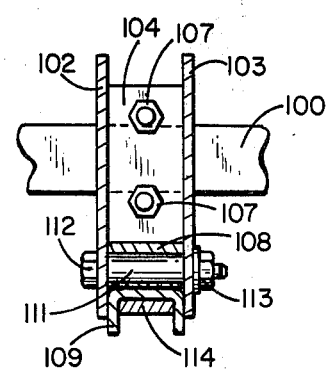
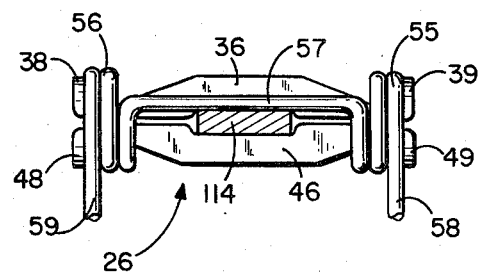

HARROW

SUMMARY OF THE INVENTION

The invention relates to a harrow useable with an earthworking implement to work and break up soil. Implements, known as field cultivators, have a plurality of earthworking tools which dig up the soil and form ridges and furrows in the surface of the soil. Plants, such as weeds, are uprooted from the soil by the earthworking tools. The soil has an uneven texture as it may contain clods, clumps or similar soil masses. The size of these soil masses varies with soil conditions, including soil type, moisture content of soil, and compactness of the soil. The harrow is an earthworking attachment adapted to be mounted on a spring cultivator tool, such as a Danish tine, to work and break up the soil in the wake of travel of the cultivator tool. The harrow has earthworking tines that break up the soil clumps and clods moving from opposite sides of the earthworking tool and levels the soil behind the earthworking tool. The tines biased to earthworking positions have oscillatory movement that facilitates the break up of soil masses. The harrow, when mounted on a spring tooth earthworking tool, has the vibratory movements of the tool in addition to its oscillatory movement. These combined movements provide the tines with impact forces that are transmitted to the soil and break up solid soil masses into fine soil particles.

The harrow includes a clamp assembly having a pair of clamp members attached to the spring tool with a fastening means, such as nut and bolt assemblies. The clamp members have opposite end portions provided with notches for accommodating coil springs. Downwardly directed earthworking tines are joined to the coil springs. A cross bar connects the coil springs and engages the body of the tool to limit the angular movement of the coil springs so that the tines are biased downwardly to normal earthworking positions. The clamp members have laterally directed ears located adjacent outer sides of the coil springs to limit lateral movement of the coil springs and maintain the coil springs in assembled relation with the clamp members.

The clamp assembly is versatile in use, as it can be mounted on a conventional cultivator tools, such as the conventional Danish tine cultivator tools. The clamp assembly has two identical clamp members clamped to the tool to mount the harrow on the tool. The clamp members also provide support or mounts for the coil springs which provides the biasing forces for the earthworking tines. The harrow is effective in breaking up the soil moving from the cultivator tool and leveling the soil behind the cultivator tool. The earthworking tines, being spring biased, oscillate as they move through the soil thereby providing impact forces that facilitate the breaking up of the clumps and clods of soil. The tines also separate soil from plant roots and leaves the plants on top of the soil.

These and other objects and advantages of the harrow are embodied in the following detail description in connection with the accompanying drawing. The drawings are described as follows.

IN THE DRAWINGS

FIG. 3 is an enlarged sectional view taken along the line 3—3 of FIG. 1;

FIG. 4 is an enlarged sectional view taken along the line 4—4 of FIG. 3;

FIG. 5 is an enlarged sectional view taken along the line 5—5 of FIG. 3;

FIG. 6 is an enlarged sectional view taken along the line 6—6 of FIG. 3;

FIG. 7 is an enlarged sectional view taken along the line 7—7 of FIG. 3;

FIG. 8 is a side elevational view of a field cultivator tool equipped with the spring harrow of the invention;

FIG. 9 is an enlarged sectional view taken along the line 9—9 of FIG. 8; and

FIG. 10 is an enlarged sectional view taken along the line 10—10 of FIG. 8.

DESCRIPTION OF PREFERRED EMBODIMENT

Figure 1:
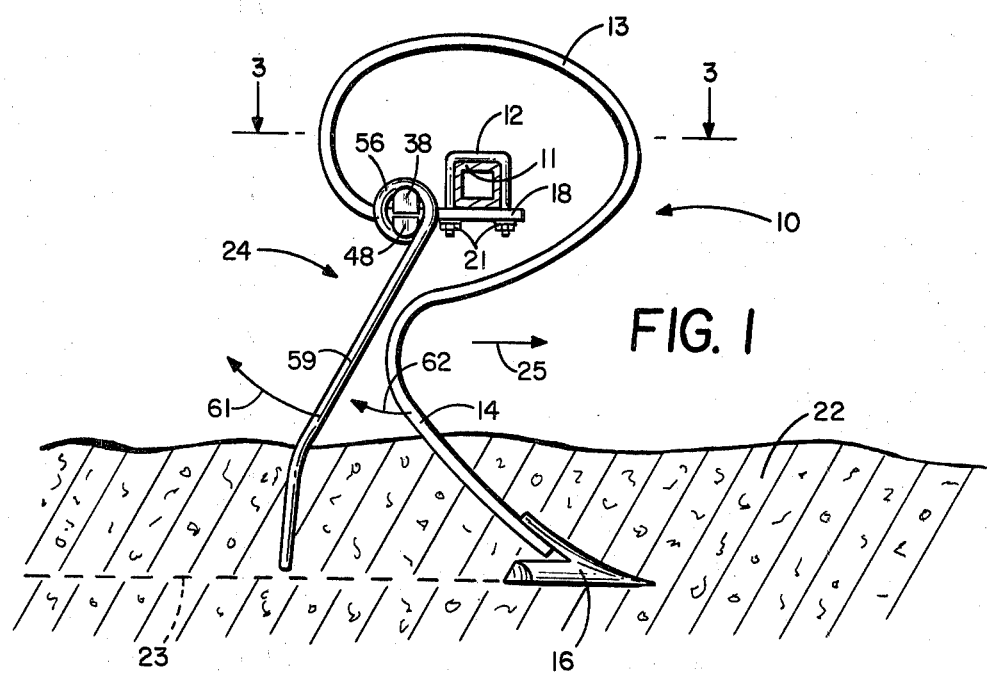
FIG. 1 is a side elevational view of an earthworking tool equipped with a spring harrow of the invention.
Figure 2:
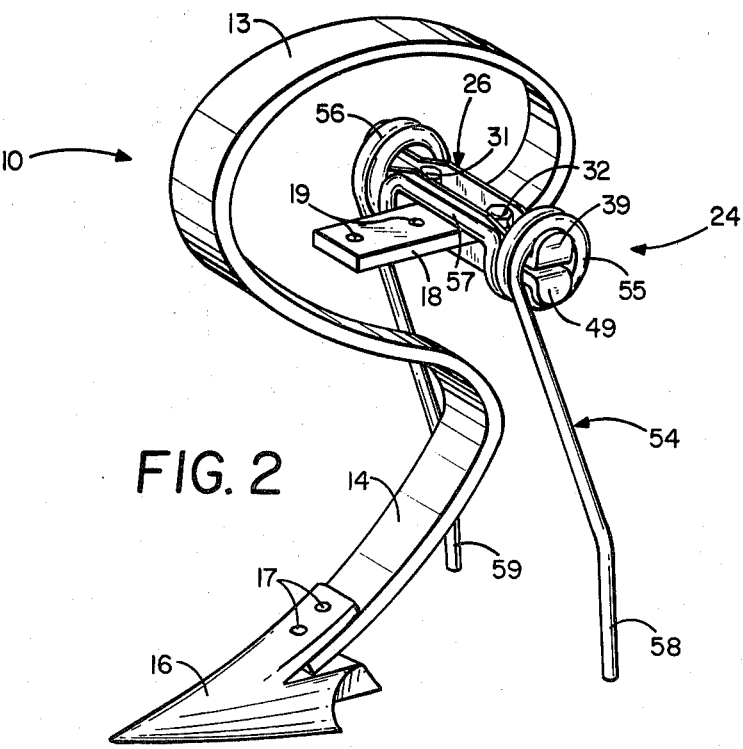
FIG. 2 is a perspective view of the earthworking tool and the spring harrow attached thereto of FIG. 1.

Referring to FIGS. 1 and 2, there is shown a primary earthworking tool 10 known as a Danish tine mounted on a tool bar or support 11 of a field cultivator. A U-bolt 12 attaches tool 10 to tool bar 11. A conventional field cultivator has a plurality of earthworking tools 10 mounted on tool bar 11. A three-point hitch (not shown) is used to mount tool bar 11 on a tractor. Tool bar 11 is located transversely behind the tractor. The tool bar can be part of the frame of a trailer-type implement.

Earthworking tool 10 has a curved spring body 13 integral with a downwardly and forwardly directed shank 14. A shovel or tool 16 is connected with a plurality of plow bolts 17 to the lower end of shank 14. Body 13 has a generally horizontal end 18 located below tool bar 11. A U-bolt 12 projects through a pair of holes 19 in end 18. Nuts 21 on U-bolt 12 clamp end 19 to the bottom of tool bar 11. As shown in FIG. 1, shank 14 extends below the surface of the ground 22 locating shovel 16 at an earthworking depth indicated by broken line 23. When tool bar 11 is moved in the forward direction indicated by arrow 25, shovel 16 and the lower portion of shank 24 lifts and breaks the soil into clumps, clods or balls. The size of the soil masses depends on varying soil conditions including the type and compaction of soil, moisture of the soil, and speed and depth of operation of the earthworking tool 10. The spring harrow of the invention indicated generally at 24 is used to break up the clumps, clods and balls of soil formed by the tool 10. Harrow 24 also separates soil from plant roots and leaves the plants on top of the soil.

Spring harrow 24 is mounted on the tool end 18 behind tool bar 11. The vibrating movements of the body 13 and 18 of tool 10 caused by its movement in the soil are transmitted to harrow 24. This increases soil break up action of harrow 24. Spring harrow 24 is a spring earthworking tool having soil engaging tines or arms 58 and 59 that breaks down and crumbles the soil worked by the primary working tool 10. Harrow 24 has a clamp assembly indicated generally at 26 mounted on end 18. As shown in FIGS. 3-7, clamp assembly 26 has a channel-shaped top clamp member 27 and a channel-shaped bottom clamp member 28. A pair of nut and bolt assemblies 31 and 32 clamp members 27 and 28 onto end 18. Top member 27 has a generally horizontal base 33 having a central recess or pocket 34 to accommodate the top portion of end 18. Upright flanges 36 and 37 are integral with opposite sides of base 33. The opposite ends of base 33 have upright ears or projections 38 and 39. Flanges 36 and 37 have notches 41 and 42 at the opposite ends thereof adjacent ears 38 and 39 forming notches or grooves.

Bottom member 28 has a generally flat horizontal base 43 with an upwardly directed recess 44 for accommodating the bottom side of end 18. A pair of downwardly directed transverse flanges 46 and 47 are integral with opposite sides of base 43. The ends of base 43 have downwardly directed ears or projections 48 and 49. Opposite end portions of flanges 46 and 47 have notches or grooves 51 and 52. As shown in FIG. 5, nut and bolt assemblies 31 and 32 are located on opposite sides of end 18 and clamp the members 27 and 28 onto end 18. End 18 being located in recesses 34 and 44 prevents lateral shifting of the clamp assembly 26 on tine end 18.

A spring tine harrow unit indicated generally at 54 is mounted on clamp assembly 26. Spring tine harrow unit 54 has a pair of coil springs 55 and 56 joined together with a transverse connecting bar 57. Bar 57 is a linear cross rod which laterally separates coil springs 55 and 56 from each other. The opposite ends of each coil spring 55 and 56 are integral with the downwardly directed tines or legs 58 and 59, respectively. Each tine 58 and 59 extends downwardly and rearwardly and has a lower forwardly bent end. The lower end of each tine 58 and 59, as shown in FIG. 1, is normally located slightly above the earthworking level 23 of shovel 16. As shown in FIGS. 2-7, coil spring 55 is located about clamp members 27 and 28 adjacent the inside of ears 39 and 49. The ears 39 and 49 function to retain spring 55 in the grooves formed by notches 42 and 52 in flanges 36, 37, 46, and 47 of members 27 and 28. Cross bar 57, extended over the top of end 18 adjacent the forward side of clamp assembly 26, functions as a stop for limiting rotation of both springs 55 and 56. Coil spring 56 is retained in the recesses formed by notches 41 and 51 with ears 38 and 48.

Returning to FIG. 1, in use, when tool 10 is moved in the forward direction indicated by arrow 25, shovel 16 and lower shank 17 lift and break the soil into various sized particles. The soil can be formed a fine granular condition to relatively large lumpy clods and balls of soil. The spring tine harrow unit 54 functions to break up and crumble the soil as it leaves the opposite sides of shank 14. Tines 58 and 59 extend downwardly and rearwardly into the soil on opposite sides of tool 10. Each tine 58 and 59 can be moved in a rearwardly and upwardly direction, as indicated by the arrow 61, against the biasing forces of the coil spring associated with the tine. The tines 58 and 59 move up and down or oscillate in accordance with the drag force of the soil on each tine. The oscillation of each tine 58 and 59 transmits impact forces on the soil, resulting in the break up of the clumps and clods of soil into fine particles of soil. The tines 58 and 59 also break up and separate soil from weed roots and cause the weeds to lie on the surface of the soil.

Clamp assembly 26 is mounted on body end 18 by inserting the end 18 between members 27 and 28 and locating the end 18 in the recesses 34 and 44, as shown in FIGS. 4 and 5. The members 27 and 28 are initially placed within circular spaces surrounded by coil springs 55 and 56. Coil springs 55 are located in the notches adjacent the insides of projections 39 and 49. Coil spring 56 is located in the notches adjacent the projections 38 and 48. The nut and bolt assemblies 31 and 32 are tightened to clamp the members 27 and 28 onto body end 18. Tines 58 and 59 leading from coil springs 55 and 56 extend downwardly adjacent opposite sides of a longitudinal line passing through shank 14 of earthworking tool 10.

In use, tines 58 and 59 work and break up the soil in the wake of travel of shank 14 and shovel 16. They work the soil laterally back into the valley or furrow formed by shovel 16. The breakdown of the soil is facilitated by the oscillatory movement of tines 58 and 59 in conjunction with the vibratory movement of body 13. These movements cause impact forces that effectively break up the clumps and clods of soil moving from opposite sides of shank 14 and shovel 16. The tines 58 and 59 can deflect rearwardly and laterally to pass or ride over an obstacle in the soil without damage to the tines. The biasing force of the coil springs 55 and 56 continuously urge the tines 58 and 59 in a forward earthworking position, as shown in FIG. 1. In this position, the tines 58 and 59 extend downwardly and rearwardly at an angle of about 30 degrees with respect to a vertical line. Tines 58 and 59 can be located at other angles.

Referring to FIGS. 8 and 9, there is shown a field cultivator tool bar 100 carrying a spring cushioned shank assembly indicated generally at 101. A spring earthworking tool indicated generally at 24 is mounted on the spring cushioned shank assembly 101.

The spring cushioned shank assembly 101 has a mount comprising a pair of generally upright side-by-side plates 102 and 103 connected together with an upright transverse base 104. A U-bolt 106 clamps base 104 to tool bar 100. Nuts 107 cooperate with the U-bolt 106 to hold the base 104 against tool bar 100. Base 104 has a forwardly and upwardly directed lip 108 located above a downwardly and rearwardly directed channel member 109. A sleeve 111 is secured by welds or the like to an upper portion of channel member 109. A bolt 112 extends through holes in plates 102 and 103 and sleeve 111 to pivotally mount channel member 109 on plates 102 and 103 for movement about a generally transverse horizontal axis. A nut 113 retains bolt 112 in assembled relation with plates 102 and 103.

A downwardly and forwardly curved shank 114 has an upper end located in the channel of channel member 109. A nut and bolt assembly 116 secures shank 114 to channel member 109. The lower end of shank 114 is attached to an earthworking shovel or spade 117. Shovel 117 is biased to an earthworking position with a spring 118. Spring 118 engages lip 108 and has an upper end attached to a bolt 119 connected to the forward end of channel member 109. The lower end of bolt 119 can hook over a flange of channel member 109. Other means can be used to connect bolt 119 to channel member 109.

A spring tine harrow unit 24, identical with the structure shown in FIGS. 3-5, is mounted on an upper end of shank 114. As shown in FIG. 10, the clamp assembly 26 is mounted on shank 114. The tine 58 and 59 extend downwardly and rearwardly adjacent opposite sides of the curved shank 114. The lower ends of the legs function to work the soil behind and laterally of the shovel 117. When the shovel 117 hits an obstruction, it will pivot upwardly and rearwardly about the pivot axis of bolt 112. The spring tine harrow unit 54 will also move upwardly and rearwardly with the shank 114. This movement is against the biasing force of the spring 118. Spring 118 will return shovel 117 to its normal earthworking position when the obstruction is passed. The coil springs 55 and 56 function to independently bias the tines 58 and 59 to their earthworking positions as shown in FIG. 8. The oscillatory movement of the tines 58 and 59 allows them to effectively break up the clumps and clods of soil that have moved from shovel 117 and shank 114.

The spring tine harrow unit 24 of the invention can be mounted on other types of earthworking tools. For example, field cultivators having the spring cultivator tools shown in U.S. Pat. Nos. 3,782,481 and 3,825,073 can be equipped with the spring tine harrow units 24 of the invention.

While there has been shown and described preferred embodiments of the invention, it is understood that changes in the structure, structural arrangement, and parts may be made by those skilled in the art without departing from the invention. The invention is defined in the following claims.

The embodiments of the invention in which an exclusive property or privilege is claimed are defined as follows:

1. A harrow for use with an earthworking tool to work the soil adjacent the earthworking tool comprising: a clamp assembly mountable on the earthworking tool, said clamp assembly having a first member, a second member, and means adapted to clamp the first and second members on the earthworking tool, said first and second members having notches adjacent opposite ends and outwardly directed ears; a harrow means mounted on the clamp assembly for working the soil adjacent the earthworking tool, said harrow means having first and second coil spring means mounted on the first and second members of the clamp assembly and tine means connected to each of the first and second coil spring means for working the soil adjacent the earthworking tool, said first coil spring means being located in said notches adjacent one of the ears of the first and second members and surrounding first adjacent ends of the first and second members, said second coil spring means being located in said notches adjacent the other of the ears of the first and second members and surrounding second adjacent ends of the first and second members, and bar means connecting the first and second coil spring means adapted to engage the earthworking tool to limit rotation of the first and second coil spring means on said clamp assembly.

2. The harrow of claim 1 wherein: said tine means including a first elongated tine connected to an end of the first coil spring means and a second elongated tine connected to an end of the second coil spring means.

3. The harrow of claim 1 wherein:
the for means connecting the first coil spring means with the second coil spring means comprises a linear bar adapted to engage the earthworking tool.

4. The harrow of claim 1 wherein:
the first member and second member are identical channel-shaped members.

5. The harrow of claim 4 wherein:
each channel-shaped member has a lateral ear on the opposite ends thereof for holding the first and second coil spring means in assembled relation with the clamp assembly.

6. The harrow of claim 4 wherein:
each channel-shaped member has side flanges, each side flange having said notches in opposite ends thereof for accommodating the first and second coil spring means.

7. The narrow of claim 1 wherein:
the first member and second member are channel-shaped members having side flanges and lateral ears on the opposite ends thereof, said side flanges having said notches adjacent the lateral ears.

8. The harrow of claim 1 wherein:
said first and second members each have a recess for accommodating a portion of the earthworking tool.

9. The harrow of claim 1 wherein:
said first and second members are channel-shaped members having bases, said bases having recesses for accommodating a portion of the earthworking tool.

10. In combination: an earthworking tool having a yieldable body adapted to be connected to a support and soil engaging means secured to the body, said body being movable in response to movement of the soil engaging means in the soil; harrow means mounted on the body for working the soil adjacent the soil engaging means, said harrow means including a clamp assembly mounted on the body, said clamp assembly having a first member, a second member, and means for clamping the first and second members on the yieldable body of the earthworking tool, said first and second members having adjacent opposite ends located on opposite sides of said yieldable body, each of said opposite ends having notches and outwardly directed ears, said biasing means including a first coil spring means located in the notches in one end of said first and second members and a second coil spring means located in notches in the other adjacent end of said first and second members, and means connecting the first and second coil spring means engageable with the yieldable body to limit rotation of the first and second coil spring means relative to said first and second members, said soil working means being connected to said first and second coil spring means; soil working means for working the soil; and biasing means connecting the soil working means to the clamp assembly.

11. The structure of claim 10 wherein:
said body has a curved spring section and a shank section, said clamp assembly being mounted on the spring section.

12. The structure of claim 10 wherein: said soil working means includes the tine means connected to the first and second coil spring means adapted to work the soil adjacent the soil engaging means.

13. The structure of claim 10 wherein:
said first member and second member are channel-shaped members having lateral end ears and flanges, said flanges having notches located adjacent the ears for accommodating the first and second coil springs.

14. The structure of claim 13 wherein:
each of said channel-shaped members has a recess for accommodating said body.

15. A harrow for use with an earthworking tool to work the soil adjacent the earthworking tool comprising: a clamp assembly mountable on the earthworking tool, said clamp assembly having a first member, a second member, and means adapted to attach the first and second members on the earthworking tool, said first and second members having notches adjacent opposite ends, harrow means mounted on the clamp assembly for working the soil adjacent the earthworking tool, said harrow means having first and second spring means mounted on the first and second members of the clamp assembly and means connected to each of the first and second spring means for working the soil adjacent the earthworking tool, said first spring means being located in said notches in one of the adjacent ends of the first and second members, said second spring means being located in said notches in the other adjacent ends of the first and second members, and means connecting the first and second spring means adapted to engage the earthworking tool to limit movement of the first and second spring means on said clamp assembly.

16. The harrow of claim 15 wherein: said means connected to each of the first and second spring means for working the soil adjacent the earthworking tool comprises elongated tines.

17. The harrow of claim 15 wherein: the means connecting the first and second spring means comprises a linear bar adapted to engage the earthworking tool.

18. The harrow of claim 15 wherein: the first and second spring means each comprise a coil spring surrounding an end of the clamp assembly.

19. The harrow of claim 18 wherein: each of the first and second members of the clamp assembly have ear means for retaining the first and second coil springs in assembled relation with the clamp assembly.

20. The harrow of claim 15 wherein: the first member and second member are channel-shaped members having side flanges, said side flanges having said notches in opposite ends thereof for accommodating said first and second spring means, said channel-shaped members including lateral ears on the opposite ends thereof for retaining said spring means in assembled relation with said channel-shaped members.

21. The harrow of claim 15 wherein: said first member and second member each have a recess for accommodating a portion of the earthworking tool.

* * * * *

UNITED STATES PATENT AND TRADEMARK OFFICE
CERTIFICATE OF CORRECTION

PATENT NO. : 4,423,787

DATED : January 3, 1984

INVENTOR(S) : Richard W. Steinberg

It is certified that error appears in the above-identified patent and that said Letters Patent is hereby corrected as shown below:

Column 3, line 43, "formed" should be -- from --.

Column 5, Claim 3, line 2, "for" should be -- bar --.

Column 6, line 1, "narrow" should be -- harrow --.

Signed and Sealed this

Twenty-sixth Day of June 1984

[SEAL]

Attest:

GERALD J. MOSSINGHOFF

Attesting Officer

Commissioner of Patents and Trademarks